United States Patent Office 3,251,906
Patented May 17, 1966

3,251,906
PREPARATION OF DETERGENT OIL-ADDITIVE GRAFT COPOLYMERS BY DELAYED ADDITION OF A LOWER ALKYL ACRYLATE TO A PARTIALLY POLYMERIZED LONG CHAIN ALKYL ACRYLATE
La Verne N. Bauer, Cheltenham, Pa., assignor to Rohm & Haas Company, Philadelphia, Pa., a corporation of Delaware
No Drawing. Filed Nov. 13, 1962, Ser. No. 237,280
15 Claims. (Cl. 260—881)

This application is a continuation-in-part of application Serial No. 119,797, filed June 27, 1961, now abandoned.

This invention concerns a new type of copolymer which imparts dispersancy to oils in which they are dissolved and also concerns compositions comprising oils having one or more of these copolymers dissolved therein. In a preferred aspect, this invention deals with lubricating compositions comprising an oil and a copolymer of this invention, said compositions possessing dispersant properties. These copolymers can also be prepared so as to supply one or more other valuable properties, including pour point depressing action, when this is desired, and improvements in viscosity and the viscosity temperature relationships.

For some time there have been used polyvalent metal salts of carboxylic acids, phenolic compounds, and organic sulfonic acids. These supply dispersing action at high temperatures, but suffer from their capacity to give inorganic residues. Then came the so-called ashless dispersants which were effective at relatively low temperatures. Some of these have proved quite useful in properly compounded oils. Even so, the search for improved oil additives has continued with objects of discovering copolymers which can be used economically in lubricating compositions to impart good dispersant properties along with one or a combination of other properties, as may be desired, such as pour depressing action, improvement in viscosity, increase in viscosity index values, effectiveness over a wide range of temperature, resistance to shear, compatibility with various other types of oil additives, or resistance to hydrolysis or oxidation. It is desired to provide an oil additive which supplies good dispersing action in oils and which at the same time exhibits one or a combination of these other desirable properties, as may be desired, and does so with economy.

For a considerable time there have been used in lubricating oils, oil-soluble polymers of acrylic esters to provide pour depressing action and improvement in viscosity index or both. While these polymers are satisfactory for their purposes, they do not supply dispersancy even though mixtures of monomeric esters have been used to form the copolymers including combinations of lauryl methacrylate and ethyl acrylate, suggested as a possible cloud point depressant in diesel fuels, or of stearyl, lauryl, butyl, and/or methyl methacrylates used to impart pour depressing action and improved viscosity temperature properties to lube oils. On the other hand, various copolymers have been prepared with lower alkyl acrylates or methacrylates and it has been noted that such copolymers are in general insoluble in a great number of mineral oils.

It has now unexpectedly been discovered that copolymers having good dispersing activity, especially at relatively low temperatures, can be prepared by polymerizing together methyl acrylate or ethyl acrylate or both and one or more polymerizable monovinylidene monomers possessing hydrocarbon groups of at least a size sufficient to impart to the final copolymer solubility in a selected oil, provided the portion of the copolymer derived from the methyl and/or ethyl acrylate is between 20% and 45% by weight of the total comonomers and a major proportion of the rest of the comonomers is from at least one alkyl acrylate or methacrylate which supplies oil-solubility in a given oil or synthetic lubricant for the final copolymer. There may also be used one or more polymerizable monoethylenically unsaturated compounds selected from the class consisting of styrene, vinyl alkyl ethers, vinyl chloride, vinylidene chloride, methacrylonitrile, acrylonitrile, methacrylic acid, acrylic acid, itaconic acid, maleic anhydride, acrylamides, methacrylamides, esters of acrylic, methacrylic, itaconic, fumaric and maleic acids, and vinyl esters of alkanoic acids.

The alcohol portion of the oil-solubilizing acrylic esters comprises alkyl groups of 12 to 24 carbon atoms. In addition, if desired, there may be copolymerized a minor proportion (usually up to 15 percent of weight of monomers) of one or more other polymerizable monoethylenically unsaturated compounds, including other alkyl esters of acrylic or methacrylic acid in which the alkyl groups contain less than 12 carbon atoms, or itaconic, maleic, or fumaric acid esters in which esters an alkyl group contains up to 18 carbon atoms, or esters of any of these acids having as their alcohol residues such groups as benzyl, alkylbenzyl, phenyl, alkylphenyl, cyclopentyl, cyclohexyl, methylcyclohexyl, butylcyclohexyl, dicyclopentyl, tetrahydrofurfuryl, methoxyethyl, phenoxyethyl, alkylphenoxyalkyl, butoxy(polyethoxy)-ethyl, phenoxy(polyethoxy)ethyl, alkylphenoxy(polyethoxy)ethyl, dodecyloxy(polyethoxy)ethyl, and similar polyether groups with 2 to 50 oxygen atoms in the other chain, butylthioethyl, ethylsulfinylethyl, 2-dimethylaminoethyl, 2-diethylaminoethyl, tert-octylaminopropyl, dimethylaminoethoxyethyl, dibutylphosphitoethyl, or diethylphosphonomethyl.

Such minor proportion may likewise be derived by copolymerizing other types of polymerizable monoethylenically unsaturated compounds, particularly those having a vinyl or isopropenyl group, such as styrene, p-methylstyrene, or other alkylstyrene, butyl vinyl ether, octyl vinyl ether, tetradecyl vinyl ether, benzyl vinyl ether, phenyl vinyl ether, cyclohexyl vinyl ether, hydroxyethyl vinyl thioether, ethyl vinyl thioether, aminoethyl vinyl ether, or other polymerizable vinyl ethers, vinyl chloride, vinylidene chloride, acrylonitrile, methacrylonitrile, acrylic or methacrylic acid, maleic anhydride, amides of polymerizable acids, including acrylamide and methacrylamide and their N-substituted derivatives, such as N- methyl-, N-butyl-, N-octyl-, N-dodecyl-, N-phenyl-, N-cyclohexyl-, N-benzyl-, N,N-dimethyl-, N,N-diethyl-, N-methyl-N-dodecyl-, N-methyl-N-benzyl-, N-methyl-N-phenyl-, or N-butoxymethyl-acrylamides or methacrylamides, vinyl esters, such as vinyl acetate, propionate, butyrate, or laurate, N-vinyl derivates of lactams and other heterocyclics, vinylpyridines, or vinyl ketones. Such monovinylidene comonomers may usually be used to provide about 1 to 15% of the final copolymer, but particularly when they contain oil-solubilizing groups, they may be incorporated in somewhat larger proportions, a typical example being copolymerizations with vinyly carboxylates having 12 to 24 carbon atoms in the portion derived from a carboxylic acid. The minor proportion of one or more of some of the above-noted polymerizable monomers often supplies a desired action for the copolymer, such as basicity, when this is desired, or even additional dispersancy.

At the present time, the most convenient comonomers for imparting solubility are the acrylic esters from long-chained alcohols. These esters may be relatively pure entities or they may be esters of commerce which are derived from mixed alcohols, such as those obtained from the hydrogenation of fatty acid esters, or fractionated distillates thereof, as mixtures comprising decyl, dodecyl, and tetradecyl alcohols, or dodecyl, tetradecyl and hexadecyl alcohols, or hexadecyl and octadecyl alcohols. Likewise, mixtures of alcohols containing eicosyl or tetracosyl alcohol may be used and also synthetic alcohols which contain branched aliphatic hydrocarbon chains, including chains having an odd number of carbon atoms. It is important to use a long-chained alkyl ester in sufficient proportion to ensure the desired degree of solubility of final copolymer in the selected oil. The proportion will be determined by the size of alkyl group, the particular oil in which the copolymer is to be used, and also the concentration of copolymer in the oil. It is only necessary to obtain a solubility at most of one or two percent in order to obtain benefits of the copolymer.

While the primary property which is provided by the copolymers of this invention is dispersing action, these copolymers at the same time may serve to increase viscosity, to improve viscosity-temperature relationship, to give pour depressing action, and to provide other desirable actions. One or more of these other properties may be emphasized by choice of comonomer or comonomers. It has been found exceptionally easy to get good depression of pour point of waxy oils with these copolymers. Even a combination of a dodecyl ester with 25% to 40% by weight of methyl acrylate provides a powerful pour point depressant, whereas heretofore a more critical choice and balance of long-chained alkyl esters was considered essential. There is criticality here, however, in the choice of methyl acrylate and in the proportion of it which is used to secure the above-noted dispersing action.

The process of this invention comprises polymerizing under the influence of a free radical polymerization initiator at least one acrylic ester, $ROOCC(R^x)=CH_2$, wherein $R^x$ is hydrogen or methyl and R is an alkyl group of sufficient size to supply oil-solubility to the final copolymer, usually an alkyl group of 12 to 24 carbon atoms, until 50 to 90%, preferably 60 to 85%, of polymer is formed and then adding to this polymerizing mixture containing polymer and monomer between about 20% and about 45% of methyl or ethyl acrylate or both, the proportion thereof being sufficient to impart dispersing action, and continuing polymerization until yield of copolymer is at least 75%.

It is possible to employ first a preformed poly(alkyl methacrylate) dissolved in one or more monomers and copolymerization with methyl or ethyl acrylate or both then effected under the influence of a free radical polymerization initiator.

In order to assure maximum desired properties one must rigidly adhere to the process of the present invention with emphasis on the copolymer with methyl or ethyl acrylate, or both, in the presence of a polymerizing mixture containing polymer and monomer as previously described, while methyl methacrylate and butyl acrylate and other related acrylates and methacrylates, outside of the present invention, can be copolymerized according to the present process in place of methyl or ethyl acrylate, the desired properties required for the present invention are not obtained. The preferred monomer in this invention if one is to emphasize ease of polymerization is ethyl acrylate whereas somewhat better desired properties are obtained when methyl acrylate is employed. Hence, each monomer has its specific advantages.

Polymerization of methyl or ethyl acrylate or both with at least one partially prepolymerized long-chained alkyl acrylate or methacrylate with, if desired, a minor proportion of one or more other polymerizable monovinylidene compound, i.e. compounds having a $CH_2=C<$ group, is effected between 65° and 145° C. under the influence of an initiator supplying free radicals within this temperature range at a rate leading to formation of copolymer. Copolymerization is best effected under an inert atmosphere, such as supplied by nitrogen. In the procedure providing optimum dispersing action, polymerization may be started with one or more long-chained acrylic esters or with a mixture of such ester or esters and a minor proportion of other polymerizable monovinylidene compounds, which may include some methyl or ethyl acrylate or both, and as polymerization progresses, methyl or ethyl acrylate along or together or in connection with other polymerizable monovinylidene compound or compounds is supplied and copolymerized. At different stages of copolymerization, different temperatures may be used. Copolymerization is carried on until the yield from all comonomers is favorable, usually in the range of 75% to 95% or more. This ensures that the methyl or ethyl acrylate which has been added copolymerizes to provide an oil-soluble and effective dispersant. Times for reaching favorable yields are from two to 24 hours at polymerizing temperatures.

During this period, initiators or initiator systems may be added from time to time. Also solvent may be desirably added to help maintain the polymerizing mixture in a fluid, stirrable state. When copolymerization has been carried to a favorable yield, residual monomer or monomers and any volatile solvent may be vaporized by heating the mixture, preferably under reduced pressure, temperatures between 100° C. and 160° C. and pressures of 2 to 30 mm. (Hg) being generally used. If prior to this heating step a relatively less volatile oil or organic solvent is mixed with the polymerized mixture, the copolymer becomes dissolved or is taken up in the oil or solvent to provide a convenient solution of the copolymer.

As a volatile solvent during copolymerization, there may be used aromatic hydrocarbons such as benzene, toluene, xylene, methylated naphthalene, or mixtures of aromatic solvents as in aromatic naphthas or distillates, esters such as ethyl acetate, ethyl propionate, or butyl acetate, ketones such as methyl ethyl ketone or methyl hexyl ketone, chlorinated solvents such as ethylene dichloride, chloroform, or chlorobenzene, or ether esters such as ethoxyethyl acetate or methoxyethoxyethyl acetate. Solvents which are useful during copolymerization and also as media for providing solutions of the final copolymer include mineral oils, dialkyl adipates, azelates, pimelates, and sebacates such as dioctyl or dinonyl azelate, adipate, or sebacate, mixtures of such diesters with linear polyesters, aryl phosphates, trialkyl phosphates, or alkylaryl phosphates, such as tributyl phosphate, dibutylphenyl phosphate, triphenyl or tricresyl phosphates, silicate esters, or silicone fluids. The less volatile esters are particularly useful when the final copolymer is intended for use in synthetic lubricants.

Even though volatile solvents are used, the polymerizing mixture may be heated well above the boiling point of such solvent. If vapors form, they may be condensed and refluxed back to the mixture. Such procedure may also be applied to methyl acrylate and to mixtures of methyl acrylate and volatile solvent. Of course, the polymerization may also be conducted under pressure without volatilization of methyl acrylate or solvent.

Solvent or solvents may be selected with chain terminating or regulating properties. Use of a chain regulating solvent or presence of a chain regulator, such as a mercaptan or thiocarbamate, may be desirable when the polymerizing mixture comprises chiefly esters of acrylic acid.

If desired, there may be used as solvent during copolymerization one or more petroleum oils of suitable purity and viscosity. A purified neutral oil is suitable for both polymerization and dilution of final copolymer to a convenient concentration or such oil may be used during copolymerization and a different oil used for dilution.

For some purposes, it may be desired to obtain copolymers free from solvents. In this case, monomers may serve as solvents or, if volatile solvents are used to ensure fluidity during copolymerization, monomer and/or solvent may be volatilized in the final heating. The product is then a rubbery, usually sticky mass.

Useful initiators include both the peroxidic and the azo catalysts. Typical peroxides include benzoyl peroxide, lauroyl peroxide, tert-butyl perbenzoate, di-tert-butyl perphthalate, 2,2-bis(tert-butyl peroxy)butane, and methyl ethyl ketone peroxide. Typical azo initiators include diisobutyronitrile, azobis(dimethylvaleronitrile), azodiisobutylamide, azobis($\alpha$-ethylbutyronitrile), and azobis($\alpha,\gamma$-dimethylcapronitrile).

Hydroperoxides provide a particularly interesting class of initiators. Typical of these are tert-butyl hydroperoxide, cumene hydroperoxide, diisopropylbenzene hydroperoxide, p-methane hydroperoxide, pinane hydroperoxide, 2,5-dimethylhexane-2,5-dihydroperoxide, and other tert-alkyl hydroperoxides and hydroperoxides and hydrocarbon-substituted benzene hydroperoxides.. The hydroperoxides become effective in providing free radicals at somewhat lower temperatures than otherwise when there is supplied an activator. Particularly effective activators are quaternary ammonium compounds such as benzyltrimethylammonium chloride, octyltrimethylammonium chloride, dodecyltrimethylammonium chloride, octyltrimethylammonium chloride, dodecyltrimethylammonium chloride, dodecyldimethylbenzylammonium chloride, dodecylbenzyldimethylbenzylammonium chloride, didodecenyldimethylammonium chloride, benzyldimethyldodecenylammonium chloride, octylphenoxyethyldimethylbenzylammonium chloride, diisobutylphenoxyethoxyethyldimethylbenzylammonium chloride, cetylpyridinium chloride, N-octyl-N-methylmorpholinium chloride, and bis-quaternary salts such as those having quaternary nitrogens linked with an alkylene group or an alkylene group interrupted by either oxygen or an amide-containing group.

As is known, different initiators tend to be effective in different ranges of temperature. Hence, choice of initiator or initiator system helps determine the range of temperatures for copolymerizations to provide copolymers of desired properties. Initiators which provide effective proportions of free radicals at the temperatures which are desired will be those of first choice. Also, as is known, choice of initiator and its concentration help determine molecular sizes of copolymers along with such factors as temperature, choice of solvent, and proportion of solvent.

The amount of initiator or of initiators may be 0.01% to about 5% of the weight of the monomers. If it is desired, the initiator may be added in increments over a period of time.

When an activator or a combination of activator and a promotor is used, the activator is best proportioned to the amount of initiator. It is generally desirable to supply additional activator when the initiator is added in increments. The proportion of activator is usually about 5% to 40% of the weight of the initiator. If desired, chain regulators such as mercaptans or other sulfur compounds may be used. Some solvents, such as aromatic hydrocarbons and chloroform may also act as chain transfer agents or regulators, as has been noted above.

Additional details of the preparation of the polymers of this invention are presented in the following illustrative examples. Parts are by weight unless otherwise designated.

In the following examples the dispersing activity of the copolymers can be determined in a test based on the Wood River Detergency Test reported by Talley and Larsen, Ind. Eng. Chem. 15, 91–5 (1943). In the modification used here, asphaltenes are prepared by oxidizing a naphthenic oil containing a trace of an iron soap and dissolving the pentane-insoluble products in chloroform at a concentration of 20 mg. per ml. A portion of 1 ml. of this solution is added to a test blend containing a determined percentage of a polymer, blends at 2, 1, 0.5, 0.125, and 0.0625% of copolymer in 10 g. of oil being used. The resulting mixture is heated at 90° C. for two hours. Dispersing activity is evaluated from the lowest blend of copolymer remaining clear. If the 2% solution of copolymer permits sludge to form, the copolymer is deemed not to be an effective dispersant. In general, this test parallels FL-2 engine tests.

EXAMPLE 1

A mixture was prepared from 202 parts of laurylmyristyl methacrylate, 20 parts of toluene and 0.8 part of 50% solution of diisopropylbenzene hydroperoxide. A portion of 66.8 parts of this mixture and 0.32 part of 25% diisobytylphenoxyethoxyethylbenzyldimethylammonium chloride monohydrate solution in n-butanol were run into a reaction vessel which had been flushed with nitrogen and heated to 105° C. When the batch reached 105° C., the remainder of the above mixture was added slowly over a 1.67 hour period. A second mixture was prepared from 101 parts of lauryl-myristyl methacrylate, 100 parts of methyl acrylate, and 0.8 part of 50% diisopropylbenzene hydroperoxide solution in alcohol and ketone. Fifteen minutes after the addition of the first monomer mixture, the second monomeric mixture was added slowly over ¾ hour. Additions of 0.32 part of 50% diisopropylbenzene hydroperoxide solution, 0.064 part of a 25% diisobutylphenoxyethoxyethylbenzyldimethylammonium chloride monohydrate solution in n-butanol, and 20 parts of toluene were made at 4.67, 5.33, 6.0 and 6.67 hours, respectively. The temperature was maintained at 103° C. until 7.1 hours, when heating was discontinued. The product was a 38.6% solution of copolymer in toluene. A 30% solution of the copolymer in toluene had a viscosity of 430 cs. at 100° F.

A mixture of 690 parts of this 38.6% solution and 600 parts of a 100 SUS neutral oil was heated to 105° C./10 mm. to give 904 parts of a 29.5% solution of copolymer in oil.

A solution of 0.25% of this copolymer in an oil disperses 0.2% of asphaltenes at 90° C.

EXAMPLE 2

There were mixed 242 parts of dodecyl methacrylate, 20 parts of toluene, 0.96 part of 50% diisocpropylbenzene hydroperoxide solution. A portion of 79 parts of this mixture was added to a reaction vessel heated at 120° C. Thereto was added 0.32 part of 25% diisobutylphenoxyethoxyethyldimethylbenzylammonium chloride solution in n-butanol. Temperature was maintained at 115–120° C. while the rest of the above mixture was added over a period of about 2 hours. After this mixture was stirred and heated for another 15 minutes, addition was begun of a mixture of 81 parts of dodecyl methacrylate, 80 parts of methyl acrylate, and 0.62 part of 50% diisopropylbenzene hydroperoxide and 45 minutes were required to complete addition of this second mixture. After 40 more minutes there were added 0.32 part of the 50% hydroperoxide solution and 0.06 part of the 25% quaternary ammonium solution together with 20 parts of toluene. Over the next 3.3 hours increments of hydroperoxide, quaternary ammonium salt, and toluene were made for a total of 1.72 parts of the 50% hydroperoxide solution, 0.38 part of the 25% quaternary solution, and 80 parts of toluene. After a total of seven hours, the batch was diluted with 375 parts of toluene and heating thereafter was discontinued. There resulted 885 parts of a toluene solution containing 39.1% of copolymer. A 30% solution of this copolymer in toluene had a viscosity of 281 cs. at 100° F.

A 0.125% solution of this copolymer in oil disperses 0.2% of asphaltenes at 90° C.

The above copolymer was evaluated in a base oil that had a viscosity index of 100, a viscosity at 120° F. of 5.43 centistokes and at 100° F. of 34.8 centistokes. This base oil gave no observable asphaltene dispersancy at 150° C. A blend of the base oil was made with 1.4% of the above copolymer giving a viscosity index of 131, a viscosity at 210° F. of 7.31 centistokes and at 100° F. of 44.1 centistokes. 2% of the above copolymer in the above base oil at 150° C. disperses 0.4% asphaltene.

There were mixed 92.1 parts of the above 39.1% copolymer solution and 74.0 parts of di-2-ethylhexyl sebacate containing 0.02% of sebacic acid. This mixture was heated for about one hour to 105° C./10 mm. to give a 31.7% copolymer solution in diester. A portion of this solution was diluted with di-2-ethylhexyl sebacate containing 0.5% of phenothiazine and 0.7% of N-phenyl-α-naphthylamine to provide a 0.63% solution of the copolymer. This solution was found to have viscosities of 4.14 cs. at 210° F. and 15.98 cs. at 100° F. This corresponds to a viscosity index of 185, illustrating the rather remarkable effectiveness of copolymers of this invention in this respect.

EXAMPLE 3

A round-bottom, 3-neck flash was equipped with a gas inlet tube, a condenser, a circular-type glass stirrer and an addition funnel. The system was flushed with nitrogen and the bath surrounding the reaction flash was maintained at an initial temperature of 110° C. A mixture was prepared from 20 parts of cetyl-stearyl methacrylate, 50 parts of lauryl-myristyl methacrylate, 0.2 part of azobisisobutyronitrile, and 10 parts of toluene. A portion of 24 parts of this mixture was added to the reaction flask. After a heating period of 0.33 hour, the remainder of the monomer mixture was added slowly during 1.67 hours. A second mixture was prepared from 30 parts of methyl acrylate, 5 parts of toluene, and 0.1 part of azobisisobutyronitrile. At the completion of the addition of the first monomer mixture at 2.00 hours, the addition of the second mixture was begun and added slowly over a 0.5 hour period. At the end of 2.50 hours, all of the monomeric mixtures had been added. Five additions, each of 0.2 part of azobisisobutyronitrile in toluene (10 parts in first, fourth and fifth additions and 5 parts in second and third additions) were made at 2.67, 3.33, 4.00, 4.67, and 5.33 hours. At 6.00 hours, 10 parts of toluene was added. The temperature was maintained between 97° C. and 106° C. until 6.50 hours when heating was discontinued. The product was a 58.6% solution of copolymer in toluene. A solution of 1% of this copolymer in an oil test blend disperses 0.2% asphaltene at 90° C. A 30% solution of copolymer in toluene has a viscosity of 147 cs. at 100° F.

EXAMPLE 4

A round-bottom, 3-neck flask was equipped with a gas inlet tube, a condenser, a circular-type glass stirrer and an addition funnel. The system was flushed with nitrogen and the bath surrounding the reaction flask was maintained at an initial temperature of 120° C. A mixture was prepared from 20 parts of cetyl-stearyl methacrylate, 50 parts of lauryl-myristyl methacrylate, 2 parts of a 10% tert-butyl perbenzoate solution in toluene and 10 parts of toluene. A portion of 24.6 parts of this mixture was added to the reaction flask. After a heating period of 0.33 hour, the remainder of the monomer mixture was added slowly during 1.67 hours. A second mixture was prepared from 30 parts of methyl acrylate, 5 parts of toluene, and 1 part of 10% tert-butyl perbenzoate solution. At the completion of the addition of the first monomer mixture at 2.00 hours, the addition of the second monomer mixture was begun and added slowly over a 0.5 hour period. At the end of 2.50 hours, all of the monomeric mixtures had been added. Five additions each of 0.2 part of 10% tert-butyl perbenzoate solution and toluene (10 parts in first, fourth and fifth additions and 5 parts in second and third additions) were made at 2.67, 3.33, 4.00, 4.67, and 5.33 hours. At 6.00 to 6.17 hours 75 parts of toluene was added. The temperature was maintained between 114–120° C. until 6.50 hours when heating was discontinued. The product was a 38.5% solution of copolymer in toluene. A solution of 0.25% of this copolymer in an oil test blend disperses 0.2% asphaltene at 90° C.

EXAMPLE 5

A round-bottom, 3-neck flask was equipped with a gas inlet tube, a condenser, a circular-type glass stirrer and an addition funnel. The system was flushed with nitrogen, and the batch surrounding the reaction flask was maintained at an initial temperature of 97° C. A mixture was prepared from 20 parts of cetyl-stearyl methacrylate, 50 parts of lauryl-myristyl methacrylate, 15 parts of toluene, and 0.2 part of benzoyl peroxide. A portion of 25.6 parts of this mixture was added to the reaction flask. After a heating period of 0.33 hour, the remainder of the monomer mixture was added slowly during 1.67 hours. A second mixture was prepared from 30 parts of methyl acrylate, 10 parts of toluene, and 0.1 part of benzoyl peroxide. At the completion of the addition of the first monomer mixture at 2.00 hours, the addition of the second monomer mixture was begun and added over 0.083 hour. At the end of 2.08 hours, all of the monomer mixtures had been added. Five additions, each of 0.02 part benzoyl peroxide and toluene (10 parts in the first and second additions; 25 parts in each of the remaining additions) were made at 2.67, 3.33, 4.00, 4.67, and 5.33 hours. At 6.00 hours, 50 parts of toluene was added. The temperature was maintained between 97° to 99° C. until 6.50 hours when heating was discontinued. The product was a 38.4% solution of copolymer in toluene. A solution of 0.25% of this copolymer in an oil test blend disperses 0.2% asphaltene at 90° C. A 5% solution of the copolymer in toluene has a viscosity of 6.41 cs. at 100° F.

EXAMPLE 6

The system was flushed with nitrogen and the bath surrounding the reaction flask was maintained at an initial temperature of 119° C. A mixture was prepared from 17.5 parts of lauryl-myristyl methacrylate, 10.0 parts of isooctyl acrylate, 2.5 parts of toluene, 0.2 part of 50% diisopropylbenzene hydroperoxide solution, 0.2 part of 5% diisobutylphenoxyethoxyethylbenzyldimethylammonium chloride solution. A portion of 11.4 parts of this mixture was added to the reaction flask. After a heating period of 0.33 hour, the remainder of the monomer mixture was added slowly during 1.67 hours. A second mixture was prepared from 15 parts of methyl acrylate, 1 part of toluene, 0.1 part of 5% diisopropylbenzene hydroperoxide solution and 0.1 part of 5% diisobutylphenoxyethoxybenzyldimethylammonium chloride solution. After the completion of the addition of the first monomer mixture at 2.00 hours, the addition of the second mixture was begun at 2.17 hours, and all the second mixture was added at 2.33 hours. Five additions, each of 0.02 part of diisopropylbenzene hydroperoxide (50% active ingredient), 0.02 part of diisobutylphenoxyethoxyethylbenzyldimethylammonium chloride (5% active ingredient) in toluene (10 parts in first three additions; 5 parts in last two additions) were made at 2.67, 3.33, 4.00, 4.67, and 5.33 hours. At 6.00 hours, 25 parts of toluene was added. The temperature was maintained at 117° to 120° C. until 6.50 hours when heating was discontinued. The product was a 47.0% solution of copolymer in toluene. A solution of 0.25% of this copolymer in an oil test blend disperses 0.2% asphaltene at 90° C. A 30% solution of the copolymer in toluene has a viscosity of 584 cs. at 100° F.

EXAMPLE 7

(a) The system was flushed with nitrogen and the bath surrounding the reaction flask was maintained at an initial temperature of 119° C. A mixture was prepared from 35 parts of lauryl acrylate, 17.5 parts of toluene, and 1 part of 10% tert-butyl perbenzoate solution and this mixture was added to the reaction flask. A second monomer mixture was prepared from 15 parts of methyl acrylate, 4 parts of toluene, and 0.5 part of 10% tert-butyl perbenzoate solution. This mixture was added to the reaction flask at 2.00 hours. Five additions, each of 0.1 part 10% tert-butyl perbenzoate solution and toluene (1 part in each of the first three additions; 5 parts in the fourth addition; 10 parts in the fifth addition) were made at 2.67, 3.33, 4.00, 4.67, and 5.33 hours. At 6.00 hours, 50 parts of toluene were added. The temperature was maintained between 113° and 119° C. until 6.50 hours when heating was discontinued. The product was a 35.6% solution of copolymer in toluene. A solution of 0.25% of this copolymer in an oil test blend disperses 0.2% asphaltene at 90° C.

(b) The preparation described above was repeated, the tert-butyl perbenzoate being substituted by diisopropylbenzene hydroperoxide with diisobutylphenoxyethoxyethylbenzyldimethylammonium chloride as activator. The product was a 37.1% solution of copolymer in toluene. A solution of 0.0625% of this copolymer in an oil test blend disperses 0.2% asphaltene at 90° C.

A 25% solution of the copolymer had a viscosity of 273.0 cs. in oil at 210° F.

EXAMPLE 8

A mixture of monomers was made from 140 parts of lauryl acrylate, 10 parts of mineral oil, and 0.02 parts of n-octyl mercaptan and thereto was added 0.4 part of a 50% solution of diisopropylbenzene hydroperoxide. To a reaction vessel was charged 20 parts of polymerization oil, 30 parts of toluene, and 12.7 parts of the above mixture together with 0.08 part of a 25% solution of diisobutylphenoxyethoxyethyldimethylbenbylammonium chloride in n-hexanol. This charge was heated at 105–112° C. until polymerization started. Then over the next 100 minutes the rest of the above mixture was added, the temperature during this addition being 112–113° C. After another 30 minutes addition to the reaction vessel was made over 40 minutes of 60 parts of methyl acrylate, 10 parts of a white polymerization oil, 0.3 part of 50% solution of diisopropylbenzene hydroperoxide, and 0.06 part of the 25% solution of quaternary ammonium salt in n-hexanol. Additional portions of the hydroperoxide solutions, the quaternary ammonium salt solution and oil were made over a period of four hours in totals of 0.56 part, 0.112 part and 50 parts respectively. Temperature was kept at about 109° C. Pressure was reduced to 10 mm. with the temperature of the reaction mixture at 105–109° C. for 20 minutes. Addition was made of 163 parts of 100 SUS neutral oil. The product was a 40% copolymer solution in oil in amount of 450 parts. At 210° F. this solution had a viscosity of 980 cs. A test blend of 0.25% of this copolymer dispersed 0.2% asphaltene at 90° C.

EXAMPLE 9

A mixture was prepared from 202 parts of laurylmyristyl methacrylate, 20 parts of toluene, and 0.8 part of a 50% solution of diisopropylbenzene hydroperoxide. A portion of 66.8 parts of this mixture and 0.32 part of a 25% solution of diisobutylphenoxyethoxyethylbenzyldimethylammonium chloride monohydrate in n-butanol were run into a reaction vessel which had been flushed with nitrogen and heated to 105° C. When the batch reached 105° C. the remainder of the above mixture was added slowly over a 1.67 hour period. A second mixture was prepared from 101 parts of lauryl-myristyl methacrylate, 100 parts of ethyl acrylate, and 0.8 part of a 50% solution of diisopropylbenzene hydroperoxide and 0.32 part of a 25% solution of diisobutylphenoxyethoxyethylbenzyldimethylammonium chloride monohydrate in n-butanol and added to the first mixture. The mixtures were polymerized at 105° C. for 7.1 hours to give a 39.7% solution of copolymer in toluene. A 30% solution of this copolymer in toluene had a viscosity of 97.9 centistokes at 100° F.

In the foregoing examples the lauryl-myristyl methacrylate is a commercial mixture of 70% dodecyl methacrylate and 30% tetradecyl methacrylate. The cetylstearyl methacrylate is a commercial mixture of hexadecyl methacrylate and 70% of octadecyl methacrylate.

Representative copolymers of this invention were dissolved in typical oils in which various common oil additives had been incorporated. These additives included zinc dialkyl dithiophosphate (1360), a mixture of an alkaline earth basic petroleum sulfonate and zinc dialkyl dithiophosphate (404), a mixture of zinc dialkyl dithiophosphate and a basic barium salt of nitrogen-containing carboxylic acids (1744), a mixture of zinc dialkyl dithiophosphates and barium salt of carboxylic acid (511), and a mixture of zinc dialkyl dithiophosphate and calcium salts of alkylphenol sulfides (65). The numbers after the additive or mixture of additives is used for identification of the tests presented in Table I wherein viscosities are summarized for typical blends of additives and of such blends to which a copolymer from 75 parts of lauryl-myristyl methacrylate and 25 parts of methyl acrylate prepared as in Example 1, was added. No significant incompatibilities were revealed in this study. Percentages in the table are by weight:

Table I

BLENDING EFFECTIVENESS OF COPOLYMER IN OILS CONTAINING COMMON ADDITIVES

| Additive Type | Percent | Percent Polymer | Viscosity, cs. 210° | Viscosity, cs. 100° F. | VI |
|---|---|---|---|---|---|
| 1360 | 1.0 | 0.0 | 6.21 | 43.94 | 96 |
|  | 1.0 | 1.0 | 7.39 | 49.75 | 118 |
| 404 | 4.8 | 0.0 | 6.54 | 45.60 | 103 |
|  | 4.8 | 1.0 | 7.78 | 52.60 | 120 |
| 1744 | 4.6 | 0.0 | 6.62 | 47.83 | 98 |
|  | 4.6 | 1.0 | 7.87 | 54.09 | 119 |
| 511 | 5.4 | 0.0 | 6.75 | 49.26 | 99 |
|  | 5.4 | 1.0 | 8.08 | 55.89 | 119 |
| 65 | 5.2 | 0.0 | 6.35 | 45.41 | 96 |
|  | 5.2 | 1.0 | 7.59 | 51.62 | 118 |

Samples of typical blends were stored at 110° F. for one week. Significant changes in viscosity did not develop.

Typical copolymers of this invention have been subjected to engine tests according to the procedure prescribed by the Coordinating Research Council under Method FL-2. In this test cleanliness of engine parts is evaluated after 40 hours of operation with a given test blend. Comparisons were made with commercial dispersants, care being taken to use the same lot of fuel for the tests being compared. The same base oil was used for the various blends, a 170 SUS solvent-refined oil, containing zinc dialkyl dithiophosphate at the recommended level of one percent. With Fuel Lot No. GA–130–5, the base oil gave a sludge rating of 53.8, a varnish rating of 13.1, and total FL-2 rating of 66.9.

There was dissolved in this base oil 1.4% of the copolymer of Example 1. The FL-2 ratings were sludge 68.0, varnish 13.0 and total 81.0.

There was dissolved in this base oil 1.4% of the copolymer of Example 9. The FL-2 ratings were sludge 59.3, varnish 13.2 and total 72.5.

There was dissolved in this base oil 1.4% of a widely used ashless detergent containing nitrogen. The FL-2 ratings were sludge 66.5, varnish 13.5 and total 80.0.

The copolymers of this invention from 20% to 45% of methyl acrylate and an acrylic ester having an alkyl portion of sufficient size to impart solubility of final copolymer in hydrocarbon oils are useful in lubricating liquids particularly to provide dispersing action. At the same time, these copolymers supply one or more other desirable properties, such as increase in viscosity, improvements in viscosity temperature relationships, and/or pour point depression. As shown above, they have rather wide compatibility with other types of oil additives. They can be used in conjunction with inhibitors, stabilizers, heavy duty detergents, oiliness agents, and other polymeric additives. For instance, a copolymer of this invention may be used in conjunction with a commercial copolymer which is especially effective as pour point depressant, such as one of stearyl methacrylate and dodecyl methacrylate and/or one of stearyl methacrylate, lauryl methacrylate, and butyl methacrylate, which is especially designed to give high values for viscosity index.

The copolymers of this invention may be prepared over the widest range of molecular weights. In the range of molecular sizes from about 10,000 to about 375,000 (viscosity average) these copolymers improve viscosity index with good stability to shear. Molecular weights may, however, reach several million and where increases in viscosity are desired, these copolymers may be very useful.

In lubricating liquids, they may be used at concentrations of about 0.1% to 20%, preferably 0.5% to 10%. For use in fuels, including gasolines, jet fuels, burner oils and the like, concentrations from 0.0002% to 0.2% are effective for dispersant properties, anti-static properties, or cloud point.

Lubricating compositions of this invention may be based on mineral oils or on synthetic lubricants. The mineral oils may vary over a wide range of viscosities, such as 1 to 25 centistokes at 210° F. These oils may be of naphthenic or paraffinic nature or may be mixtures of the various types of oils. They may be distillates or mixtures of neutral oils and bright stocks. The lubricants may be bodied or gelled and used as greases, if so desired. The oils may vary from spindle oils or hydraulic oils to oils for reciprocating aircraft engines. They include oils for sparking combustion and compression ignition engines, varying from grades identified as S.A.E. 10 to S.A.E. 50. Other types of lubricants are also included, such as automatic transmission fluids.

The synthetic lubricants include esters, such as have been referred to above and shown useful as solvents for making concentrates of the copolymers. Typical synthetic lubricants are based on dioctyl or dinonyl adipates, azelates or sebacates, or when the liquids are used as hydraulic fluids, phosphate esters, but other esters, ether esters, and also ethers may be used. Various polyethers based on ethylene and/or propylene oxide have been used in this field and have been available under such trade names as Ucon and Ambiflo.

Liquid fuels in which the copolymers of this invention find use are combustible mineral oil distillates. They may vary in distillation range from 75° to 700° F. For example, gasoline might boil within the range of 75° to 450° F.; kerosene 350° to 550° F.; fuel oils 300° to 700° F.; and jet fuels 150° to 600° F.

The combustible mineral oil distillates include kerosenes, furnace oils, burner oils, diesel fuels, jet fuels and gasolines. The jet fuels vary considerably from oils of the nature of kerosenes to mixtures of these with gasoline cuts. The distillates may be straight-run or cracked oils or mixtures. The color bodies, sludges or sediments which develop in such oils during storage or handling which result in deposits may be inhibited or dispersed by choice of a copolymer of this invention.

I claim:
1. The process for preparing oil-soluble copolymers which comprises first polymerizing under the influence of a free radical polymerization initiator at least one ester having the formula

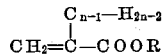

wherein $n$ is a integer of 1 to 2 and R is alkyl of 12 to 24 carbon atoms, until about 50 to 90% thereof has formed polymer and then adding to this polymer mixture containing polymer and monomer between about 20 and about 45%, based on the weight of the total monomers used of, at least one ester having the formula $$CH_2=CHCOOR^1$$

wherein $R^1$ is alkyl of 1 to 2 carbon atoms and continuing polymerization of the resulting mixture until the yield of the total copolymer is at least 75%.

2. The process for preparing oil-soluble copolymers which comprises first polymerizing under the influence of a free radical polymerization initiator at least one ester having the formula

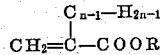

wherein $n$ is an integer of 1 to 2 and R is alkyl of 12 to 24 carbon atoms together with a minor proportion of at least one different polymerizable monoethylenically unsaturated compound until about 50 to 90% thereof has formed polymer and then adding to this polymer mixture containing polymer and monomer between about 20 and about 45%, based on the weight of the total monomers used of, at least one ester having the formula $$CH_2=CHCOOR^1$$

wherein $R^1$ is alkyl of 1 to 2 carbon atoms and continuing polymerization of the resulting mixture until the yield of the total copolymer is at least 75%.

3. The process according to claim 2 in which the different polymerizable monoethylenically unsaturated compound is a member selected from the class consisting of styrene, vinyl alkyl ethers, vinyl chloride, vinylidene chloride, methacrylonitrile, acrylonitrile, methacrylic acid, acrylic acid, itaconic acid, maleic anhydride, methacrylamides, acrylamides, vinyl alkanoates and esters of acrylic, methacrylic, itaconic, fumaric and maleic acids.

4. The process for preparing oil-soluble copolymers which comprises first polymerizing under the influence of a free radical polymerization initiator at least one ester having the formula

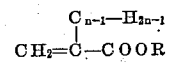

wherein $n$ is an integer of 1 to 2 and R is alkyl of 12 to 24 carbon atoms, until about 60 to 85% thereof has formed polymer and then adding to this polymer mixture containing polymer and monomer between about 20 and about 45%, based on the weight of the total monomers used of, at least one ester having the formula $$CH_2=CHCOOR^1$$

wherein $R^1$ is alkyl of 1 to 2 carbon atoms and continuing polymerization of the resulting mixture until the yield of the total copolymer is at least 75%.

5. The process for preparing oil-soluble copolymers which comprises first polymerizing under the influence of a free radical polymerization initiator at least one ester having the formula

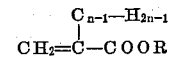

wherein $n$ is an integer of 1 to 2 and R is alkyl of 12 to 24 carbon atoms together with a minor proportion of at least one different polymerizable monoethylenically unsaturated compound until about 60 to 85% thereof has formed polymer and then adding to this polymer mixture containing polymer and monomer between about 20 and about 45%, based on the weight of the total monomers used, of at least one ester having the formula $$CH_2=CHCOOR^1$$

wherein $R^1$ is alkyl of 1 to 2 carbon atoms and continuing polymerization of the resulting mixture until the yield of the total copolymer is at least 75%.

6. The process of claim 1 in which $n=1$ and $R^1$=methyl.

7. The process of claim 1 in which $n=1$ and $R^1$=ethyl.

8. The process according to claim 1 in which $R^1$ represents both methyl and ethyl.

9. The product of claim 1.

10. The product of claim 2.

11. The product of claim 3.

12. The product of claim 4.
13. The product of claim 5.
14. The product of claim 6.
15. The product of claim 7.

References Cited by the Examiner

UNITED STATES PATENTS

| | | | |
|---|---|---|---|
| 2,129,478 | 9/1938 | Rohm | 260—89.5 |
| 2,389,227 | 11/1945 | Wright | 252—56 |
| 2,396,192 | 3/1946 | Morgan | 252—56 |
| 2,478,416 | 8/1949 | Miller | 260—89.5 |
| 2,604,453 | 7/1952 | Papkin | 260—86.1 |
| 2,957,854 | 10/1960 | Lorensen et al. | 252—51.5 |
| 2,992,203 | 7/1961 | Protzman | 260—885 |
| 3,067,163 | 12/1962 | Bauer | 252—51.5 |

FOREIGN PATENTS 455,221  3/1949  Canada.

MURRAY TILLMAN, *Primary Examiner.*

PAUL M. COUGHLAN, JR., *Examiner.*